(12) United States Patent
Fukuda et al.

(10) Patent No.: US 9,484,057 B2
(45) Date of Patent: Nov. 1, 2016

(54) HOLOGRAM RECORDING AND REPRODUCING APPARATUS

(71) Applicant: HITACHI-LG DATA STORAGE, INC., Tokyo (JP)

(72) Inventors: Kouji Fukuda, Tokyo (JP); Takashi Nagai, Tokyo (JP); Akihiro Ashida, Tokyo (JP); Yuuki Yamasaki, Tokyo (JP); Shinsuke Takatsuka, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 15/015,774

(22) Filed: Feb. 4, 2016

(65) Prior Publication Data

US 2016/0254021 A1    Sep. 1, 2016

(30) Foreign Application Priority Data

Feb. 26, 2015  (JP) ................................. 2015-037299

(51) Int. Cl.
*G11B 17/04*  (2006.01)
*G11B 17/022*  (2006.01)
*G11B 17/028*  (2006.01)
*G11B 17/025*  (2006.01)
*G11B 5/55*  (2006.01)

(52) U.S. Cl.
CPC ......... *G11B 17/022* (2013.01); *G11B 17/0288* (2013.01); *G11B 5/5552* (2013.01); *G11B 17/025* (2013.01)

(58) Field of Classification Search
None
See application file for complete search history.

(56) References Cited

U.S. PATENT DOCUMENTS

| 5,519,553 A * | 5/1996 | Hashimoto | G11B 5/5521 360/267.1 |
| 7,308,694 B2 * | 12/2007 | Someno | G11B 7/085 720/695 |
| 2001/0033446 A1 * | 10/2001 | King | G06K 7/084 360/48 |

FOREIGN PATENT DOCUMENTS

JP    04-281263 A    10/1992

* cited by examiner

*Primary Examiner* — Carlos E Garcia
(74) *Attorney, Agent, or Firm* — Volpe and Koenig, P.C.

(57) ABSTRACT

A disk conveyance unit 3 conveys the disk medium 2 to a position where recording and reproducing are performed by the pickup 1 with the spindle motor 4 held. The disk conveyance unit 3 includes first movement mechanisms 22 and 24 for moving a first conveyance frame 30 with respect to fixed frames 10 and 20 and second movement mechanisms 34 and 36 for moving a second conveyance frame 40 holding a spindle motor 4 with respect to the first conveyance frame 30. The first and second movement mechanisms move to substantially the same direction and operate independently from each other. This allows the disk of the hologram recording and reproducing apparatus to be moved at a high speed and positioned at a high accuracy.

4 Claims, 7 Drawing Sheets

HOLOGRAM RECORDING AND REPRODUCING APPARATUS 100 (DISK RETREAT POSITION)

HOLOGRAM RECORDING AND REPRODUCING APPARATUS 100
(DISK RECORDING AND REPRODUCING POSITION)

DISK CONVEYANCE UNIT 3 (PERSPECTIVE VIEW VIEWED FROM DIRECTION A)

TOP VIEW OF APPARATUS

CROSS SECTION ALONG B-B

CROSS SECTION ALONG C-C

PICKUP 1 (WITH NO DISK LOADED)

PICKUP 1 (WITH DISK LOADED)

PICKUP 1 (SIDE VIEW VIEWED FROM DIRECTION D)

HOLOGRAM RECORDING AND REPRODUCING APPARATUS

CLAIM OF PRIORITY

The present application claims priority from Japanese patent application serial No. JP 2015-037299, filed on Feb. 26, 2015, the content of which is hereby incorporated by reference into this application.

BACKGROUND OF THE INVENTION (1) Field of the Invention

The present invention relates to a hologram recording and reproducing apparatus for recording and reproducing data on and from a holographic disk medium.

(2) Description of the Related Art

A disk conveyance mechanism of a general disk apparatus is such that a disk used for recording and reproducing data is stored in a tray and moved to a position where a spindle and a pickup are located. Japanese Patent Laid-Open No. 4-281263, for example, discusses a structure in which disks different in diameter are stored together in a tray and conveyed by the tray which can be moved in the longitudinal and lateral directions.

SUMMARY OF THE INVENTION

A conventional disk conveyance mechanism in which a disk is moved to a position where a spindle and a pickup are located is configured only by a linear movement mechanism of one system with respect to one movement direction. Even in the case of Japanese Patent Laid-Open No. 4-281263, the tray on which the disks are laid can be moved in the longitudinal and lateral directions, however, the tray is configured by a linear movement mechanism of one system with respect to one movement direction (a longitudinal direction, for example). For the case of the linear movement mechanism of one system, a movement speed and a positioning accuracy are associated with each other and the high movement speed lowers the positioning accuracy.

In the hologram recording and reproducing apparatus, a pickup is fixed because it is large and a hologram disk medium is moved to a pickup position, so that the moving stroke of the disk medium is large. On the other hand, a highly accurate positioning is needed to cause the pickup to oppose a desired recording and reproducing position (track position) of the disk medium so that a high-density hologram recording is realized. Because of these reasons, it has been difficult to increase a moving speed (decrease a moving time) and the positioning accuracy using the disk movement mechanism of only one system.

The purpose of the present invention is to allow the disk of the hologram recording and reproducing apparatus to be moved at a high speed and positioned at a high accuracy.

The hologram recording and reproducing apparatus according to the present invention includes a pickup which is attached to a fixed frame and irradiates the hologram disk medium with a laser beam to record and reproduce data on and from the hologram disk medium, a spindle motor for holding and rotating the disk medium, and a disk conveyance unit for holding the spindle motor and conveying the disk medium to a position where recording and reproducing are performed by the pickup. The disk conveyance unit includes a first movement mechanism for moving a first conveyance frame with respect to the fixed frame and a second movement mechanism for moving a second conveyance frame for holding the spindle motor with respect to the first conveyance frame. The first and second movement mechanisms move to substantially the same direction and operate independently from each other.

According to the present invention, the hologram recording and reproducing apparatus allows the disk medium to move at a high speed and position accurately, which contributes to improvement in a recording and reproducing performance.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

An embodiment of the present invention is described below with reference to the attached drawings.

Figure 1:
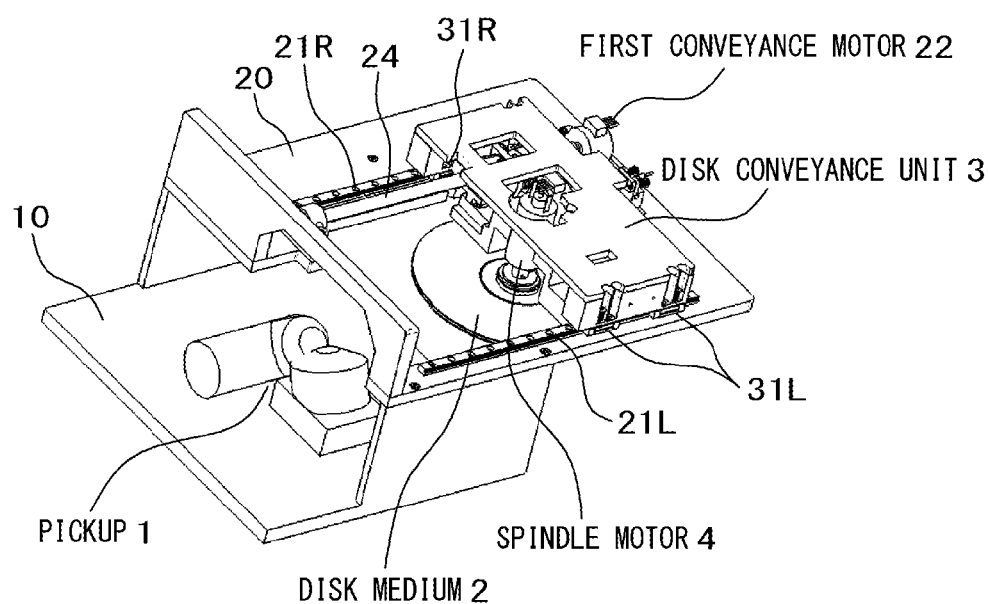
FIG. 1 is a perspective view showing a general structure of the hologram recording and reproducing apparatus (in a disk retreat position)
Figure 2:
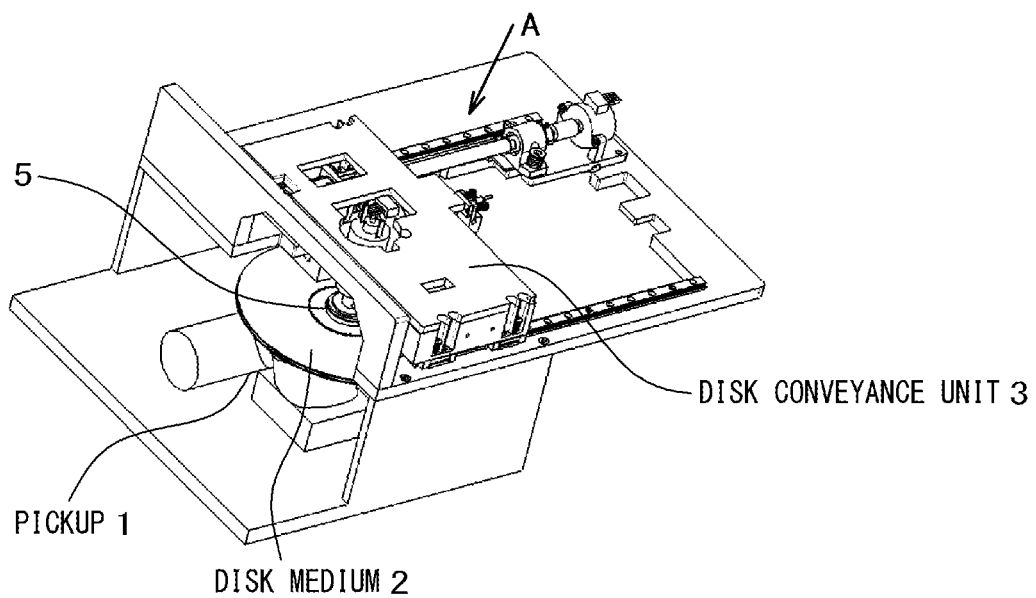
FIG. 2 is a perspective view showing a general structure of the hologram recording and reproducing apparatus (in a disk recording and reproducing position)

FIGS. 1 and 2 are perspective views showing the general structure of the hologram recording and reproducing apparatus. FIG. 1 shows a state where a disk medium 2 lies in a retreat position. FIG. 2 shows a state where the disk medium 2 lies in a recording and reproducing position. In the disk conveyance described below, the disk medium is moved from the state in FIG. 1 to that in FIG. 2 or vice versa.

In FIG. 1, the hologram recording and reproducing apparatus 100 includes a pickup 1 for irradiating a hologram disk medium 2 (hereinafter simply referred to as a disk medium) with a laser beam to record and reproduce data on and from the hologram medium 2, a spindle motor 4 for holding and rotating the disk medium 2, and a disk conveyance unit 3 for holding the disk medium 2 and the spindle motor 4 and conveying them to a position where the pickup 1 lies.

The pickup 1 is fixed to an optical frame 10 and the disk conveyance unit 3 is movable on a disk conveyance base frame 20. The optical frame 10 and the disk conveyance base frame 20 are fixed by a fastening member.

To the disk conveyance base frame 20 are attached two linear guide rails 21L and 21R for conveying the disk conveyance unit 3 and a first conveyance motor 22 for drive. To the disk conveyance unit 3 are attached two linear guides 31L and 31R in a position where the linear guides 31L and 31R oppose the linear guide rails 21L and 21R. The first conveyance motor 22 is rotated to drive a feed screw 24, moving the linear guides 31L and 31R along the linear guide rails 21L and 21R. Thereby, the disk conveyance unit 3 moves on the disk conveyance base frame 20 while holding the disk medium 2 and the spindle motor 4.

FIG. 2 shows a state where the disk conveyance unit 3 moves and conveys the disk medium 2 to the position where the pickup 1 lies, that is, where recording and reproducing are performed. The disk medium 2 is attracted by a cradle 5 mounted on the spindle motor 4, held by the disk conveyance unit 3 and moved.

The disk conveyance unit 3 according to the present embodiment has movement mechanisms of two stages (two systems). The following describes the configuration of the movement mechanism.

Figure 3:
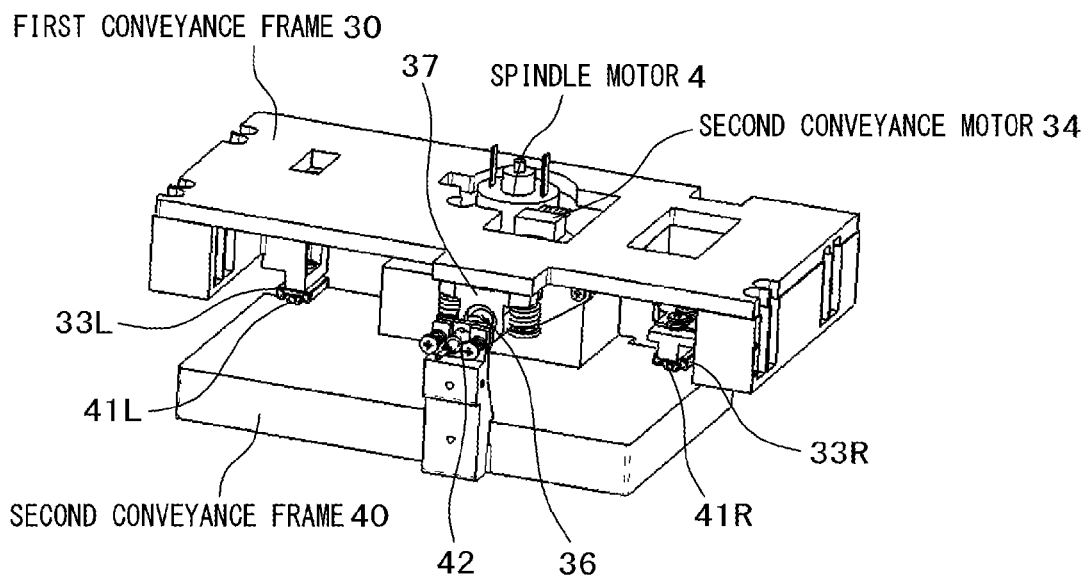
FIG. 3 is a perspective view showing the internal structure of the disk conveyance unit 3.

FIG. 3 is a perspective view showing the internal structure of the disk conveyance unit 3 as viewed from the direction of an arrow A in FIG. 2. The disk conveyance unit 3 includes a first conveyance frame 30 and a second conveyance frame 40 which are relatively movable to each other. The first conveyance frame 30 is driven by the first conveyance motor 22 to move with respect to the disk conveyance base frame 20 (which is described in FIGS. 1 and 2, and referred to as a first movement mechanism). On the other hand, the second conveyance frame 40 holds the disk medium 2 and the spindle motor 4 for rotating the disk medium 2 and is driven by a second conveyance motor 34 to move with respect to the first conveyance frame 30 (which is referred to as a second movement mechanism). The first and second movement mechanisms move to substantially the same direction, however, the movement speed and the movement pitch thereof are made different as described below.

In the second movement mechanism, to the first conveyance frame 30 are attached two linear guide rails 33L and 33R for conveying the second conveyance frame 40 and a second conveyance motor 34 for drive. To the second conveyance frame 40 are attached two linear guides 41L and 41R in a position where the linear guides 41L and 41R oppose the linear guide rails 33L and 33R. The second conveyance motor 34 is rotated to drive a feed screw 36, moving the linear guides 41L and 41R along the linear guide rails 33L and 33R. The feed screw 36 is rotatably pivoted on a bearing 37. A nut 42 attached to the second conveyance frame 40 engages with a spiral shape of the feed screw 36.

Figure 4A:
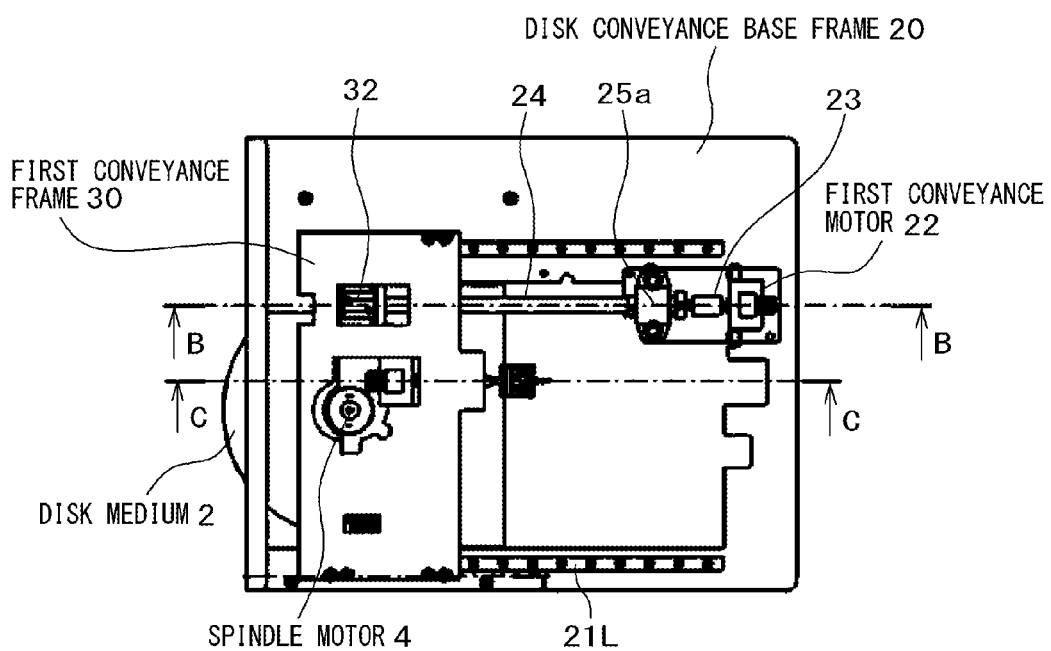
FIGS. 4A to 4C show in detail the movement mechanisms of two systems of the disk conveyance unit 3.
Figure 4B:
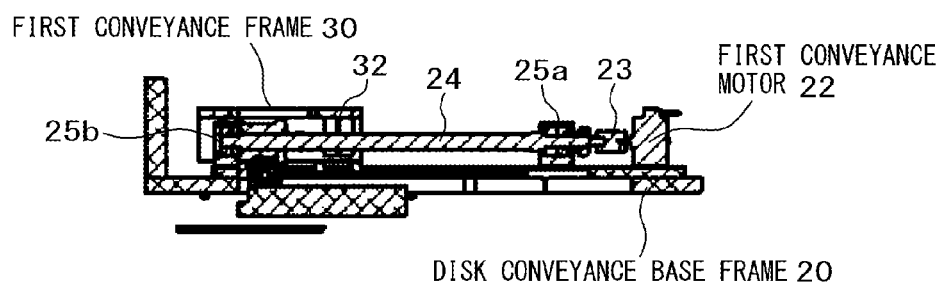
Figure 4C:
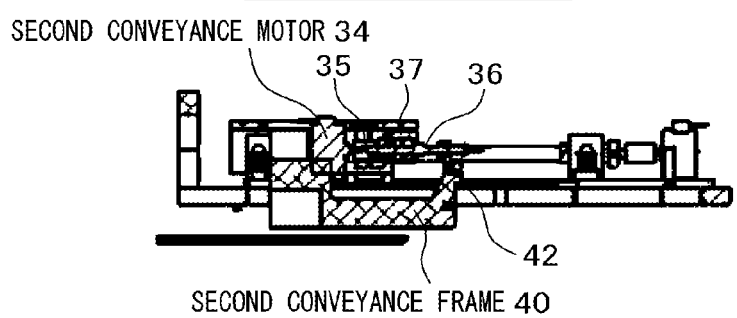

FIGS. 4A to 4C show in detail the movement mechanisms of two systems for the disk conveyance unit 3. FIG. 4A shows a top view of the hologram recording and reproducing apparatus. FIG. 4B shows a cross section along line B-B in FIG. 4A in relation to the first movement mechanism. FIG. 4C shows a cross section along line C-C in FIG. 4A in relation to the second movement mechanism.

In the top view of FIG. 4A, there can be seen the first conveyance frame 30 moving on the disk conveyance base frame 20, the first conveyance motor 22 and the feed screw 24 which drive the first conveyance frame 30, and the linear guide rails 21L and 21R.

FIG. 4B shows the first movement mechanism. The first conveyance motor 22 and bearings 25a and 25b are fixed to the disk conveyance base frame 20. The feed screw 24 is rotatably pivoted on the bearings 25a and 25b. The axle end portion (right end) of the feed screw 24 is coupled to the leading edge of rotating shaft of the first conveyance motor 22 by a coupling 23 to transmit the rotation power of the first conveyance motor 22 to the feed screw 24. A nut 32 fixed to the first conveyance frame 30 engages with a spiral shape of the feed screw 24. Thereby, the first conveyance frame 30 is linearly moved by the power of the first conveyance motor 22 from a position where the disk retreats as shown in FIG. 1 to a position where recording and reproducing are perform on the disk shown in FIG. 2.

FIG. 4C shows the second movement mechanism. The second conveyance motor 34 and the bearing 37 are fixed to the first conveyance frame 30. The feed screw 36 is rotatably pivoted on the bearing 37. The axle end portion (left end) of the feed screw 36 is coupled to the leading edge of rotating shaft of the second conveyance motor 34 by the coupling 37 to transmit the rotation power of the second conveyance motor 34 to the feed screw 36. The nut 42 fixed to the second conveyance frame 40 engages with a spiral shape of the feed screw 36. Thereby, the second conveyance frame 40 can be linearly moved to substantially the same direction in which the first movement mechanism moves by the power of the second conveyance motor 34 independently of the operation of the first movement mechanism.

The spindle motor 4 is fixed to the second conveyance frame 40 and the cradle 5 provided with a magnet is fixed to the rotating shaft of the spindle motor 4. This allows the second conveyance frame 40 to be moved with the metal portion of the disk medium 2 attracted by the cradle 5.

The first and second movement mechanisms are made different in a movement characteristic using the conveyance motors 22 and 34. In other words, in the first movement mechanism, the increase of a movement stroke (a maximum movement distance) and a movement pitch (a movement amount per unit driving signal) allows a movement speed to be increased. On the other hand, in the second movement mechanism, the decrease both of the movement stroke and the movement pitch improves the positioning accuracy. This allows the first movement mechanism to coarsely adjust the positioning and the second movement mechanism to finely adjust the positioning, for example. These can be realized by switching the driving condition of the conveyance motors 22 and 34 even in the same movement mechanism. For example, the driving condition of a pulse motor is selected to allow the mechanism to be used by making the ratio of the movement pitch different by 10 to 100 times.

Thereby, the first and second movement mechanisms are driven while being switched to allow the disk medium to be accurately positioned in a short time. The first and second movement mechanisms are provided to produce an effect in which not only the disk medium can be conveyed from the disk retreat position to the recording and reproducing position but also a seek operation on the disk medium (switching a track position) can be quickly and accurately performed.

The following describes the recording and reproducing operation of the hologram recording and reproducing apparatus according to the present embodiment. The recording and reproducing operation is performed such that the pickup 1 irradiates the disk medium 2 with a laser beam to record and reproduce data.

Figure 5:
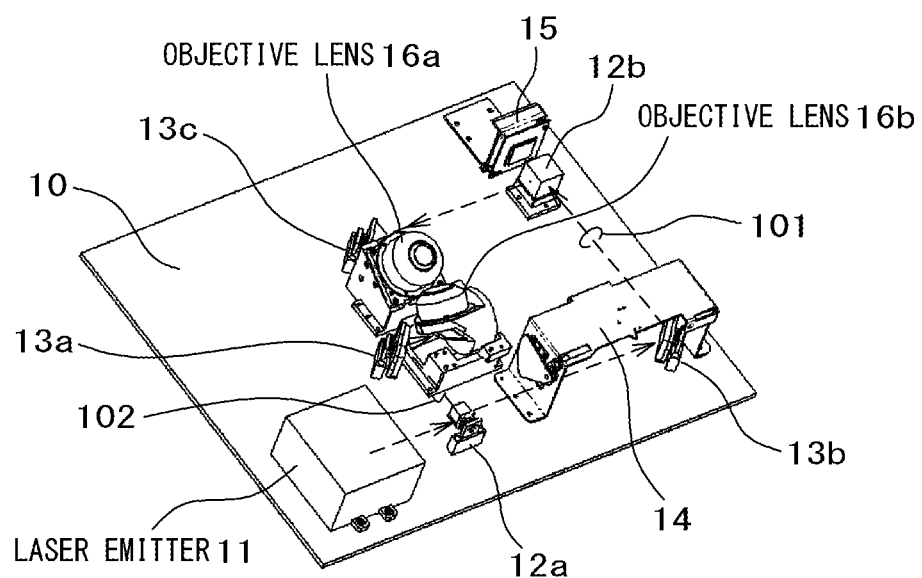
FIG. 5 is a perspective view showing the internal structure of the pickup 1 with no disk medium loaded.
Figure 6:
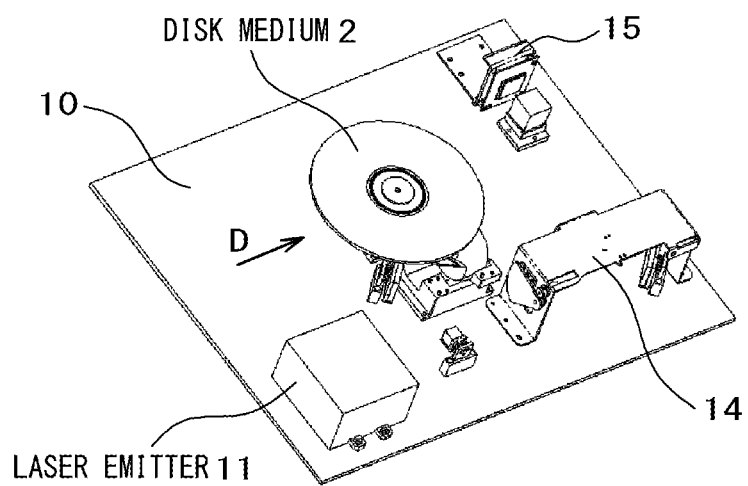
FIG. 6 is a perspective view showing the internal structure of the pickup 1 with the disk medium loaded.
Figure 7:
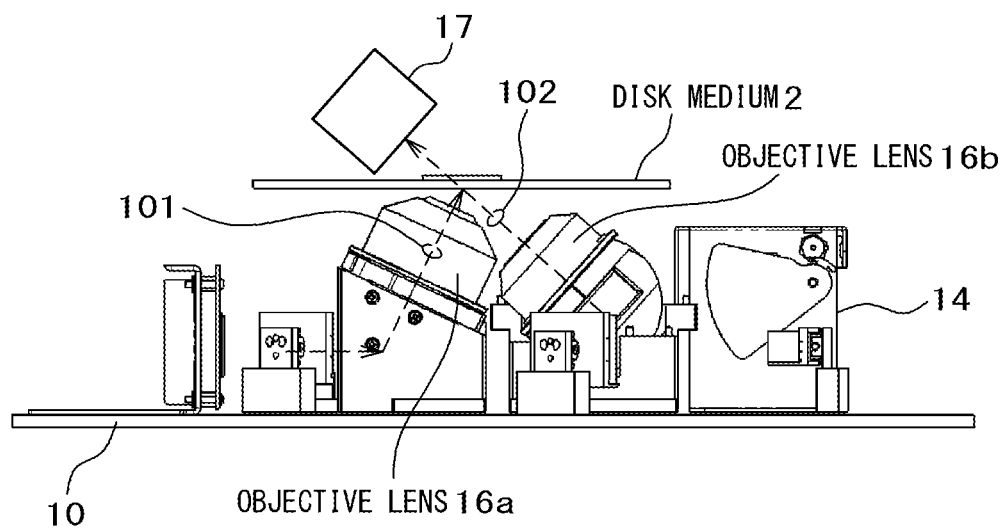
FIG. 7 is a side view showing the internal structure of the pickup 1 with the disk medium loaded.

FIGS. 5 to 7 show the internal configuration of the pickup 1. FIG. 5 shows a perspective view with no disk medium loaded. FIG. 6 shows a perspective view with the disk medium loaded. FIG. 7 shows a side view of FIG. 6.

In FIG. 5, the pickup 1 is fixed to the optical frame 10, and optical devices such as a laser emitter 11, spectroscopes 12a and 12b, mirrors 13a, 13b, and 13c, a shutter mechanism unit 14, an optical modulator 15, and objective lenses 16a and 16b are arranged at the illustrated positions.

A laser beam emitted by the laser emitter 11 is branched into two systems of optical paths 101 and 102 by the spectroscope 12a. The optical path 101 transmits a signal light in recording and the optical path 102 transmits a reference light in both recording and reproducing. The signal light is emitted from the objective lens 16a and passes through the shutter mechanism unit 14 for controlling an emission time, the mirror 13b, the spectroscope 12b, the optical modulator 15 for modulating the laser beam by recording data, the spectroscope 12b, and the mirror 13c. The reference light is emitted from the objective lens 16b and passes through the mirror 13a. At an extension optical path area for the optical path 102 through which the reference light emitted from the objective lens 16b passes, there is arranged a phase conjugate unit 17 for emitting return light along the same trajectory as that of the optical path 102 (refer to FIG. 7).

FIG. 6 shows a state where the pickup 1 shown in FIG. 5 is loaded with the disk medium 2. The phase conjugate unit 17 is omitted in FIG. 6. FIG. 7 is a side view of FIG. 6 when viewing the pickup 1 from a direction indicated by an arrow D. The disk medium 2 is conveyed by the disk conveyance unit 3 and held in a space between the objective lenses 16a and 16b of the pickup 1 and the phase conjugate unit 17.

At the time of recording, the hologram disk medium 2 is irradiated with the signal light which is emitted from the objective lens 16a of the pickup 1 and passes through the optical path 101 and the reference light which is emitted from the objective lens 16b and passes through the optical path 102 to record the data by the interference pattern (hologram) generated at that time. At the time of reproducing, the shutter mechanism unit 14 is operated to shut off the signal light passing through the optical path 101 and the disk medium 2 is irradiated only with the reference light passing through the optical path 102 to reproduce the data (hologram) recorded on the disk medium 2 by the return light (conjugate light) generated by the phase conjugate unit 17, detecting reproducing light via the objective lens 16a.

The selection of recording/reproducing positions on the disk medium 2 performs positioning in the disk radius direction by the movement of the disk conveyance unit 3 and positioning in the circumferential direction of the disk by the rotation position of the spindle motor 4. According to the disk conveyance mechanism of the present embodiment, the disk conveyance unit 3 has the movement mechanisms of two systems (the first and second movement mechanisms) movable to substantially the same direction, so that the movement mechanisms are driven while being switched to allow accurate positioning of the disk medium in a short time. For this reason, the disk conveyance mechanism contributes to improvement in performance of the hologram recording and reproducing apparatus.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A hologram recording and reproducing apparatus for recording and reproducing data on and from a hologram disk medium comprising:
    a pickup which is attached to a fixed frame and irradiates the hologram disk medium with a laser beam to record and reproduce data on and from the hologram disk medium;
    a spindle motor for holding and rotating the hologram disk medium; and
    a disk conveyance unit for holding the spindle motor and conveying the hologram disk medium to a position where recording and reproducing are performed by the pickup; wherein
    the disk conveyance unit includes a first movement mechanism driven by a first conveyance motor for moving a first conveyance frame with respect to the fixed frame and a second movement mechanism for driven by a second conveyance motor for moving a second conveyance frame for holding the spindle motor with respect to the first conveyance frame, and the first and second movement mechanisms move substantially in the same direction and operate independently from each other, wherein switching driving conditions of the first and second conveyance motors makes the first movement mechanism different from the second movement mechanism in movement speed and movement pitch.

2. The hologram recording and reproducing apparatus according to claim 1, wherein
    the movement speed of the first movement mechanism is larger than the movement speed of the second movement mechanism and the movement pitch of the second movement mechanism is smaller than the movement pitch of the first movement mechanism.

3. The hologram recording and reproducing apparatus according to claim 1, wherein a ratio of the movement pitch of the first movement mechanism to the movement pitch of the second movement mechanism is between 10 to 100.

4. The hologram recording and reproducing apparatus according to claim 1, wherein the first conveyance motor increases the movement speed and the movement pitch of the first movement mechanism, and the second conveyance motor decreases the movement speed and the movement pitch of the second movement mechanism.

* * * * *